United States Patent
Park et al.

(10) Patent No.: US 7,285,358 B2
(45) Date of Patent: Oct. 23, 2007

(54) NEGATIVE ACTIVE MATERIAL FOR LITHIUM RECHARGEABLE BATTERIES AND METHOD OF FABRICATING SAME

(75) Inventors: Jung-Joon Park, Bucheon (KR); Ho-Jin Kweon, Cheonan (KR); Jang-Ho Yoon, Cheonan (KR); Jun-Won Suh, Cheonan (KR)

(73) Assignee: Samsung SDI Co., Ltd., Suwon-si (KW)

( * ) Notice: Subject to any disclaimer, the term of this patent is extended or adjusted under 35 U.S.C. 154(b) by 0 days.

(21) Appl. No.: 10/160,204

(22) Filed: May 30, 2002

(65) Prior Publication Data

US 2003/0096167 A1    May 22, 2003

(30) Foreign Application Priority Data

Oct. 17, 2001 (KR) ................. 2001-63842

(51) Int. Cl.
*H01M 4/58* (2006.01)
*B05D 5/12* (2006.01)

(52) U.S. Cl. ............... 429/231.8; 429/218.1; 429/231.6; 427/113; 427/126.3

(58) Field of Classification Search ........... 429/231.8, 429/218.1, 136, 137, 138, 142, 144, 231.6, 429/231.9; 427/113, 126.3
See application file for complete search history.

(56) References Cited

U.S. PATENT DOCUMENTS

| | | | |
|---|---|---|---|
| 3,011,920 A | | 12/1961 | Shipley, Jr. |
| 4,938,780 A | * | 7/1990 | Kaiya et al. ............. 29/623.5 |
| 5,200,282 A | * | 4/1993 | Ohnishi et al. ............. 429/223 |
| 6,096,454 A | * | 8/2000 | Tran et al. ............. 429/231.8 |
| 6,391,495 B1 | | 5/2002 | Choi et al. |

FOREIGN PATENT DOCUMENTS

| | | | |
|---|---|---|---|
| CN | 1254961 A | | 5/2000 |
| JP | 64-59766 | * | 3/1989 |
| JP | 11-120992 | | 4/1999 |
| JP | 2001-85003 | * | 3/2001 |
| JP | 2002-124262 | * | 4/2002 |

OTHER PUBLICATIONS

Patent Abstract of Japan, Publication No. 11-120992, Published on Apr. 30, 1999, in the name of Inoue Tomohiro, same as above.

* cited by examiner

*Primary Examiner*—Raymond Alejandro
(74) *Attorney, Agent, or Firm*—Christie, Parker & Hale, LLP (57) ABSTRACT

The present invention relates to a negative active material for a lithium rechargeable battery and a method of preparing the same, and the negative active material prepared by coating a carbon source with a coating liquid, and drying the carbon source, and the negative active material comprises a core having a carbon source with surface-treatment layer formed on the surface of the core, the surface-treatment layer having at least one compound of coating element selected from the group cosnsisting of amorphous, semi crystalline, or crystalline hydroxides, oxyhydroxides, oxycarbonates, and hyd roxidecarbonates.

The present invention provides a negative active material coated with a surface-treatment layer of a coating-element-included hydroxide, a coating-element-included oxyhydroxide, a coating-element-included oxycarbonate, or a coating-element-included hydroxycarbonate, and thereby a battery having the negative active material has less change in thickness after expansion of the active material, that is, from 12.2% to 5.3%, and furthermore, cycle-life characteristics are improved (7% or more improvement at the 200th cycle) and voltage characteristics are improved (0.04 V or more improvement at the 200th cycle).

10 Claims, 5 Drawing Sheets

NEGATIVE ACTIVE MATERIAL FOR LITHIUM RECHARGEABLE BATTERIES AND METHOD OF FABRICATING SAME

CROSS REFERENCE TO RELATED APPLICATION

This application claims priority of application No. 2001-63842 filed in the Korean Industrial Property Office on Oct. 17, 2001, the disclosure of which is incorporated herein by reference.

BACKGROUND OF THE INVENTION (a) Field of the Invention

The present invention relates to a negative active material for lithium rechargeable batteries and a method of fabricating the same, and particularly to a negative active material in which the swelling phenomenon is suppressed and cycle-life characteristics are improved, and a method of fabricating the same.

(b) Description of the Related Art

A rechargeable lithium battery having an average discharge voltage of approximately 3.7 V is considered to be one of the essential components in the digital generation since it is an indispensable energy source for portable digital devices, such as cellular pones, notebook computers, and camcorders (i.e., the so called "3C" devices).

Currently, more than 95% of the negative active material used for lithium rechargeable batteries is made of graphite having a high crystallinity. Graphite is generally classified into artificial graphite, in which the particle is processed, and natural graphite, in which the particle is not processed, and it has a characteristic shape, particle size, and surface features depending upon the source and the processing method. Accordingly, graphite is considered as a main factor in determining both the efficiency at early cycles and the long-term cycle-life characteristics of a lithium rechargeable battery.

For a rectangular-type battery, the thickness of the battery varies depending upon the type of graphite since the graphite undergoes a side reaction with electrolytes resulting in the production of gas. In detail, the electrolyte may undergo a side reaction with the graphite at the surface thereof in the early battery charge stage so that the surface of the graphite will be coated with a thin layer of a lithium organic compound, called a Solid Electrolyte Interface (SEI). In this side reaction, gas is also produced, and it makes the battery expand, which is called a swelling phenomenon and which causes problems to users. The phenomenon is determined according to the types of electrolyte and graphite used in the battery.

The cycle-life characteristics of the lithium rechargeable battery are dependent upon the type of SEI layer formed on the graphite. A more serious swelling problem occurs on the electrode plate during repeated cycles of several tens or hundreds. It is postulated that the swelling phenomenon results from the electrochemical reaction between the surface of the negative active material and the electrolyte; and in countries having a climate of high temperature and high humidity, the swelling phenomenon tends to occur more often when the battery is operated under high temperature. In this case, it is reported that the negative active material is also considered to be a decisive factor for the phenomenon.

To meet world demands for a battery having a high capacity, battery manufacturers have put a great deal of effort into solving the swelling problem. One proposal is to modify the surface of the graphite so that the efficiency during early cycles is improved, the gas generated from the side reaction with electrolytes is prevented, and the cycle-life characteristics are thereby improved. Another is to provide a novel functional electrolyte.

It has also been suggested that a negative active material be coated with graphite or amorphous carbon to maintain stability during reaction with electrolyte, that an additive such as vinyl carbonate or vinyl sulfone be added to the negative active material to increase the stability of the surface of the negative active material, and that the negative active material be treated with a metal alkoxide solution. However, since research has not yet solved the swelling problems to a satisfactory extent, demands to solve the problem continue.

SUMMARY OF THE INVENTION

In one embodiment, the present invention provides a negative active material comprising a core having a carbon source and a surface-treatment layer formed on the surface of the core, the surface-treatment layer having at least one coating element compound selected from the group consisting of a coating-element-included hydroxide, a coating-element-included oxyhydroxide, a coating-element-included oxycarbonate, and a coating-element-included hydroxycarbonate.

The present invention also provides a method of preparing a negative active material for a lithium rechargeable battery comprising coating a carbon source with a coating liquid, and drying the carbon source, wherein the coating liquid comprises a solute of a coating element source and a solvent of a mixture of an organic solvent and water.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Reference will be made in detail to the preferred embodiments of the present invention, examples of which are illustrated and explained in the accompanying drawings and in specific examples, wherein like reference numerals refer to like elements throughout. The embodiments are described below in order to explain the present invention by referring to the figures and specific examples.

The present invention provides a negative active material in which a carbon source, such as crystalline, amorphous, natural, or artificial graphite, has been coated with a surface-treatment layer rendering the surface stable, so that gas is not generated when the battery is charged and discharged or stored at a high temperature. The swelling phenomenon is thereby suppressed, and cycle-life and power characteristics are improved.

The negative active material of the present invention includes a core having a carbon source and a surface-treatment layer formed on the surface of the core. The surface-treatment layer has at least one coating element compound selected from the group consisting of coating-element-included hydroxides, coating-element-included oxyhydroxides, coating-element-included oxycarbonates, and coating-element-included hydroxycarbonates.

The coating element compound for the surface-treatment layer may have an amorphous, semi-crystalline, or crystalline structure, and preferably a crystalline structure. The coating element may include any element soluble in both water and an organic solvent, and it preferably includes Mg, Al, Co, K, Na, Ca, Si, Ti, V, Sn, Ge, Ga, B, As, Zr, or a mixture thereof.

The carbon source for the core may include any conventional carbon compound used for a negative active material in this art, that is, a compound capable of taking part in an electrochemical redox reaction and capable of reversibly intercalating lithium ions. Examples thereof include, but are not limited to, amorphous carbon and crystalline carbon. Examples of amorphous carbon include soft carbon (carbon that is sintered at a low temperature) and hard carbon, mesophase pitch carbide and sintered coke. Examples of crystalline carbon include shapeless, sheet, flake, spherical, and fiber-type natural graphite and artificial graphite.

Hereinafter, a method of preparing a negative active material is described in detail.

A carbon compound is first immersed in a coating liquid. The coating liquid includes a solute of a coating element source and a solvent including a mixture of an organic solvent and water.

The coating process according to this embodiment of the invention includes a general purpose coating method such as a sputtering method, a chemical vapor deposition method, a dip coating method, or the like. The dip coating method is considered to be simple and includes the steps of mixing the negative active material in the coating liquid to form a slurry, and removing the excess coating liquid.

Alternatively, the coating process may include a one-shot process in which a removing process and an additional drying process are performed at the same time. The method has the advantages of simplicity and economy, and is capable of providing a negative active material with a more uniform surface-treatment layer composed of at least one coating element compound selected from the group consisting of a coating-element-included hydroxide, a coating-element-included oxyhydroxide, a coating-element-included oxycarbonate, and a coating-element-included hydroxycarbonate.

The one-shot process includes the steps of introducing a carbon source and a coating liquid into a mixer and heating the mixer while agitating it. Additionally, blowing gas may be injected into the mixer to increase the reaction rate. The blowing gas helps to facilitate the evaporation of solvent in the coating liquid and to purge impure gases that are present in the mixer. The blowing gas may include $CO_2$ or a moisture-free inert gas, such as nitrogen gas or argon gas. Alternatively, the one-shot process may be performed under a vacuum rather than by using blowing gas.

While the coating liquid is coated on the surface of the negative active material, excess coating liquid may be evaporated and removed by increasing the ambient temperature and agitating. Thus, the slurry preparing process, the solvent removing step, and the drying step are performed in a single mixing vessel, instead of being individually performed in separate vessels. To obtain a uniform surface-treatment layer, a premixing step may be performed for about 10 to 30 minutes following the introduction of the carbon source and the coating liquid into the mixer.

The temperature of the mixer is increased by circulating hot water around the mixer. The hot water has a temperature at which the solvent evaporates, preferably at or between about 50 and about 100° C. The hot water may cool while circulating in the mixer, so the cooled water is heated with a heat exchanger and re-circulated around the mixer.

Figure 1:
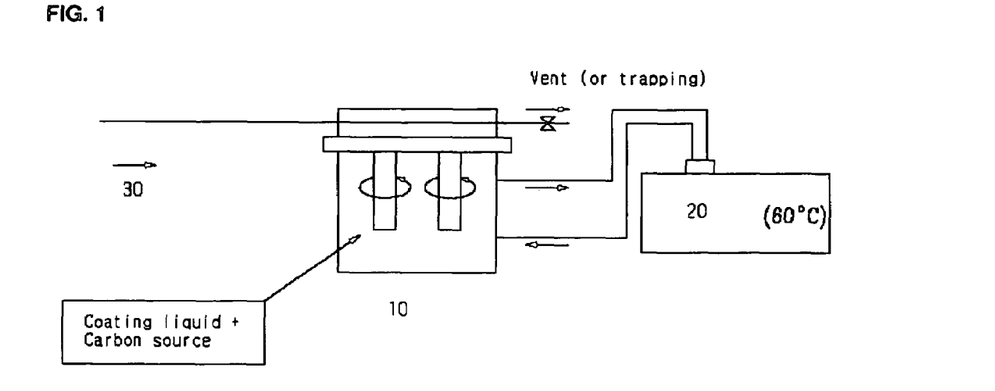
FIG. 1 is a schematic view showing a device for carrying out a coating process of a negative active material for a lithium rechargeable battery according to the present invention.

The mixer includes any mixer so long as it facilitates mixing of the carbon source and the coating liquid, and is capable of raising its interior temperature. The mixer is preferably equipped with an inlet capable of injecting blowing gas, and it is preferred that it can maintain a vacuum state. FIG. 1 shows a planetary mixer 10 equipped with a heat exchanger 20 used in one embodiment of the present invention. As shown in FIG. 1, the planetary mixer 10 is equipped with an inlet 30 for blowing nitrogen gas therein at an upper portion thereof while hot water is circulated around the mixer through the heat exchanger.

The coating liquid is prepared by adding a coating element source to an organic solvent and further adding water. The resultant coating liquid may have a form of solution or suspension according to the embodiment of the invention.

As mentioned above, since the coating liquid includes both the organic solvent and water as a solvent, the adherent strength is advantageously improved, the swelling phenomenon is suppressed, and the cycle-life characteristics are improved compared to the case of exclusively using organic solvent without adding water. If only organic solvent is used for the solvent for the coating liquid, the coating element source such as Al-isopropoxide readily reacts with $H_2O$ molecules present in the atmosphere as shown in Reactive Formula 1.

Al(OCH(CH$_3$)$_2$)$_3$+3H$_2$O→Al(OH)$_3$+3 (OCH(CH$_3$)$_2$)$_3^-$+3H$^+$  Reactive Formula 1:

The surface of the negative active material thereby becomes hydrophilic, resulting in weakening of the adherent strength and decreasing the capacity. On the other hand, when the solvent includes water in addition to the organic solvent, the reaction of Reactive Formula 1 is already progressed prior to applying the coating liquid to the negative active material. Metal (Al) oxide, which does not react with water, will be present on the surface during the coating process. The negative active material coated with the coating liquid thereby becomes hydrophobic on the surface thereof, rendering the surface stabilized.

The amount of water is preferably at or between 10 and 100 moles, and is more preferably at or between 20 and 70 moles with respect to 1 mole of the coating element source. When the amount of water is outside the above range, the coating element source is insufficiently hydrolyzed so that the desired surface state is not obtained.

Examples of the organic solvent include, but are not limited to, alcohols such as methanol, ethanol, and isopropanol, hexane, chloroform, tetrahydrofuran, ether, methylene, chloride, and acetone.

The coating element source includes a coating element and an alkoxide, a salt, and an oxide of the coating element according to embodiments of the invention. One having ordinary skill in the art can easily choose a suitable coating element source by considering the type of coating liquid. As examples of the coating element source according to embodiments of the invention, tetraethyl orthosilicate is used as a silicon source, whereas $HB(OH)_2$, $B_2O_3$, or $H_2BO_3$ is used as a boron source. When vanadium is used as a coating element according to an embodiment of the invention, vanadium oxide ($V_2O_5$) or a vanadate such as ammonium vanadate ($NH_4(VO_3)$) may be used.

The coating element source includes any coating element or any coating-element-included compound that is soluble in the solvent. The coating generally includes Mg, Al, Co, K, Na, Ca, Si, Ti, V, Sn, Ge, B, As, Zr, or a mixture thereof, according to an embodiment of the invention.

The concentration of the coating-element source is roughly at or between 0.01 and 20 wt % of the coating solution according to an embodiment of the invention. Preferably, the concentration is at or between 0.1 and 10 wt % of the coating solution. When the concentration thereof is below 0.01 wt %, coating is not fully effective, whereas when the concentration of the coating element source is more than 20 wt %, the thickness of the resultant coating layer is thicker than desired.

When the general purpose coating process is used, the graphite powder coated with the coating liquid is dried at or between room temperature and 200° C. for 1 to 24 hours.

However, when the one-shot coating process is used, an additional drying process is not required since the drying process is simultaneously performed with the coating process.

During the drying process, the coating liquid is converted to a coating-element-included hydroxide by reacting with the moisture in the atmosphere layer having hydroxides on the surface thereof. It is also possible to obtain a surface-treatment layer having oxyhydroxides, oxycarbonates, or hydroxycarbonates. Depending on the processing conditions, the surface-treatment layer may contain various mixed compositions of a coating-element-included hydroxide, a coating-element-included oxyhydroxide, a coating-element-included oxycarbonate, and a coating-element-included hydroxycarbonate. For example, if the drying process is performed under carbonate gas, the surface-treatment layer may predominantly contain the coating-element-included oxycarbonate or the coating-element-included hydroxycarbonate.

The thickness of the surface-treatment layer is preferably at or between 1 and 300 nm, and more preferably at or between 1 and 50 μm. If the thickness is less than 1 nm, the effect of the surface-treatment layer on the battery performance is insignificant, whereas if it is more than 300 nm, the thickness is too great to facilitate the movement of $Li^+$ ions through the coating layer.

The concentration of the coating element source in the surface-treatment layer is preferably $2 \times 10^{-5}$ to 2 wt %, and more preferably 0.001 to 2 wt %.

The negative active material coated with the surface-treatment layer can be applied to the negative active material for a battery, and it can be sieved to get a desired particle size.

The following examples further illustrate the present invention, but it is not limited to these examples.

COMPARATIVE EXAMPLE 1

Graphite (available under the trade name of P15B-HG from Carbon, Inc., Japan) and a polyvinylidene fluoride binder in a weight ratio of 96:4 were distributed in an N-methyl-2-pyrrolidone solvent to obtain a negative active material slurry. The slurry was cast on a 10 μm copper foil and dried to produce a negative electrode.

$LiCoO_2$ powder was coated with a 5 wt % Al-isopropoxide suspension and heated at 600° C. to prepare a positive active material. The resultant positive active material, a polyvinylidene fluoride binder, and a carbon conductive agent in a weight ratio of 94:2:2 were mixed and distributed in an N-methyl-2-pyrrolidone solvent to obtain a positive active material slurry. The positive active material slurry was cast on a 20 μm-aluminum foil and dried to produce a positive electrode.

Using the prepared negative and positive electrodes and a separator of a polyethylene film, an ICP463448-type lithium cell was fabricated by winding and compressing the electrodes and the separator and placing them in a rectangular can. For an electrolyte, a 1M $LiPF_6$ solution of ethylene carbonate and diethyl carbonate (3:7 volume ratio) was used.

COMPARATIVE EXAMPLE 2

Graphite (available under the trade name of DJG from Dae-Back-Sa, Korea) and a polyvinylidene fluoride binder in a weight ratio of 94:6 were distributed in an N-methyl-2-pyrrolidone solvent to obtain a negative active material slurry. The slurry was cast on a 10 μm-copper foil and dried to produce a negative electrode.

$LiCoO_2$ powder was coated with a 5 wt % Al-isopropoxide suspension and heated at 600° C. to prepare a positive active material. The resultant positive active material, a polyvinylidene fluoride binder, and a carbon conductive agent in a weight ratio of 96:2:2 were mixed and distributed in an N-methyl-2-pyrrolidone solvent to obtain a positive active material slurry. The positive active material slurry was cast on a 20 μm-aluminum foil and dried to produce a positive electrode.

Using the prepared negative and positive electrodes and a separator of a polyethylene film, an ICP463448-type lithium cell was fabricated by winding and compressing the electrodes and the separator and placing them in a rectangular can. For an electrolyte, a 1M $LiPF_6$ solution of ethylene carbonate and diethyl carbonate (3:7 volume ratio) was used.

REFERENCE EXAMPLE 1

An ICP463448-type rectangular-type lithium cell was fabricated by the same procedure as in Comparative Example 1, except that graphite and 0.1 wt % Al-isopropoxide suspension were loaded into a mixer as shown in FIG. 1 and dried for 3 hours and agitated to prepare a negative active material coated with a surface-treatment layer, and for an electrolyte, a 1M LiPF$_6$ dimethyl carbonate, diethyl carbonate, fluorobenzene, and vinyl sulfone was used.

Figure 2:
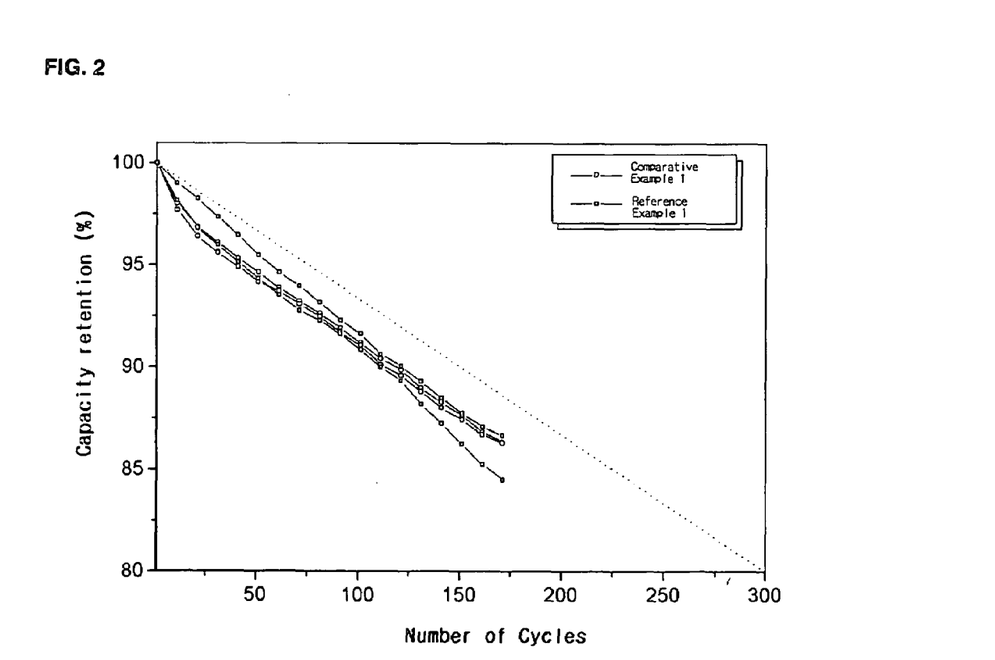
FIG. 2 is a graph illustrating cycle-life characteristics of negative active materials according to Comparative Example 1 and Reference Example 1.

The cells fabricated by the methods according to Comparative Example 1 and Reference Example 1 were charged and discharged at 1C. and the results are shown in FIG. 2. As shown in FIG. 2, the negative active material of Reference Example 1, which is coated exclusively with an Al-isopropoxide suspension without H$_2$O, has cycle-life characteristics comparable to that of Comparative Example 1, which is not coated, even with an Al-isopropoxide suspension. Accordingly, it may be postulated that a surface-treatment layer of only an Al-isopropoxide suspension does not affect characteristics of the negative active material.

REFERENCE EXAMPLE 2

An ICP463448-type rectangular-type lithium cell was fabricated by the same procedure as in Comparative Example 1, except that graphite and a 1 wt % Al-isopropoxide suspension were loaded into a mixer as shown in FIG. 1 and dried for 3 hours and agitated to prepare a negative active material coated with a surface-treatment layer, and for an electrolyte, a 1M LiPF$_6$ dimethyl carbonate, diethyl carbonate, fluorobenzene, and vinyl sulfone was used.

EXAMPLE 1

An ICP463448-type rectangular-type lithium cell was fabricated by the same procedure as in Comparative Example 1, except that graphite (2000 g, available in the trade name DJG, manufactured by Dae-Back-Sa, Korea) and a 0.5 wt % Al-isopropoxide suspension (10 g (0.05 mole) Al-isopropoxi were loaded into a mixer as shown in FIG. 1, and 22 g (1.2 mole) of H$_2$O were further added thereto and dried for 3 hours and agitated to prepare a negative active material coated with a surface-treatment layer, and for an electrolyte, a 1M LiPF$_6$ solution of ethylene carbonate, dimethyl carbonate, diethyl carbonate, fluorobenzene, and vinyl sulfone was used.

Figure 3:
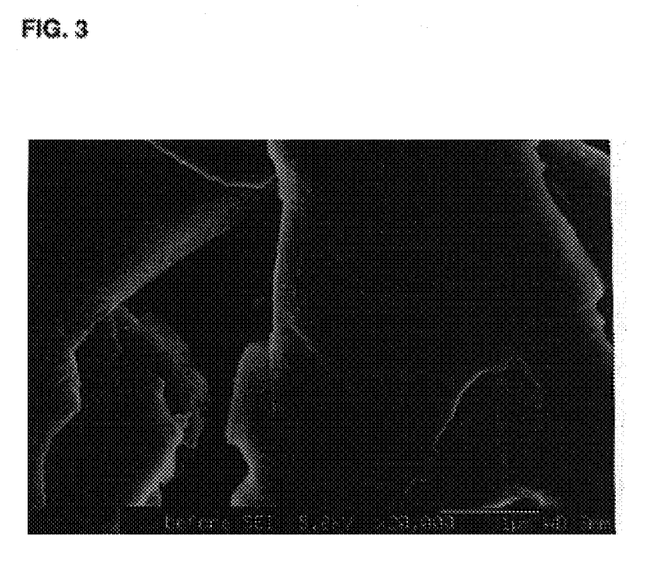
FIG. 3 is a SEM photograph of a negative active material according to Example 1 of the present invention.
Figure 4:
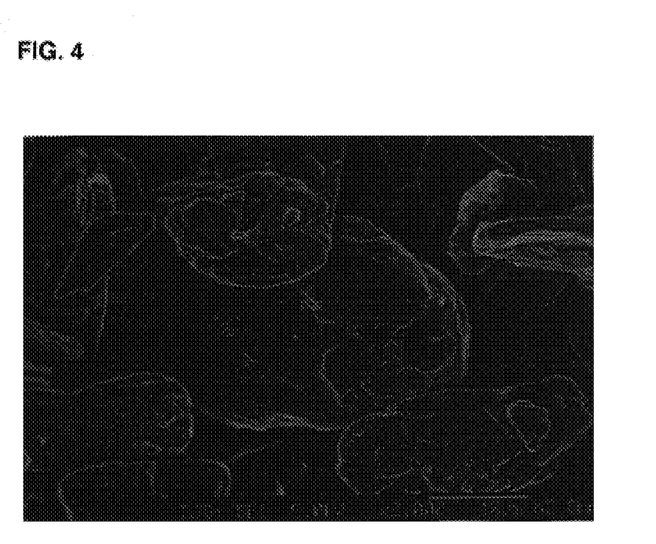
FIG. 4 is a SEM photograph of a negative active material according to Comparative Example 1.

FIGS. 3 and 4 show SEM photographs of negative active materials according to Example 1 and Comparative Example 1, respectively. As shown in FIGS. 3 and 4, the negative active material of Comparative Example 1, which is not coated with a surface-treatment layer, has a very rough surface, whereas the negative active material of Example 1, coated with a surface-treatment layer, has a smooth surface.

EXAMPLE 2

A positive active material of LiCoO$_2$ powder, a polyvinylidene fluoride binder, and a carbon conductive agent in a weight ratio of 94:2:2 were mixed and distributed in an N-methyl-2-pyrrolidone solvent to obtain a positive active material slurry. The positive active material slurry was cast on a 20 μm-aluminum foil and dried to produce a positive electrode.

Al-isopropoxide was weighted to 0.5% based on the negative active material and distributed in ethyl alcohol (10 g (0.05 mole) Al-isopropoxide+190 g ethanol) and 44 g (2.4 mole) of H$_2$O were further added. Then, a crystalline artificial graphite negative active material (2000 g, available under the trade name of P15B-HG from Carbon, Inc., Japan) was mixed therewith to form a slurry. The slurry was dried in a dry oven and ethyl alcohol was evaporated, and thereby a negative active material coated with a surface-treatment layer was obtained. The resultant negative active material and polyvinylidene fluoride in a weight ratio of 96:4 were distributed in an N-methyl-2-pyrrolidone solvent to provide a negative active material slurry. The slurry was cast on a 10 μm-copper foil and dried to produce a negative electrode.

Using the prepared negative and positive electrodes and a 25 μm separator of a polyethylene film, an ICP463448-type lithium cell was fabricated by winding and compressing the electrodes and the separator and placing them in a rectangular can. For an electrolyte, a 1M LiPF$_6$ solution of ethylene carbonate and dimethyl carbonate (1:1 volume ratio) was used.

Figure 5:
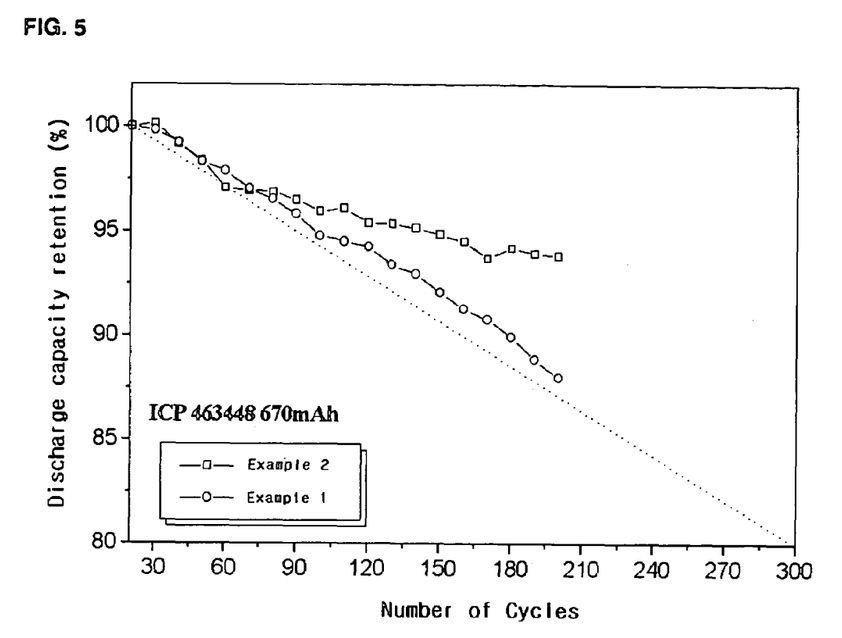
FIG. 5 is a graph illustrating cycle-life characteristics of cells according to Examples 1 and 2 of the present invention.

FIG. 5 shows the cycle-life characteristics of Examples 1 and 2. The cycle-life characteristics were measured by charging and discharging the cells at a 1 C rate. As shown in FIG. 5, the cell of Example 2 has cycle-life characteristics superior to those of Example 1, which is postulated to be because more water is used in Example 1 than in Example 2 so that the surface of Example 1 is better modified and an SEI film formed during an early charge stage becomes more stable, and thereby the degeneration of the active material is inhibited.

Figure 6:
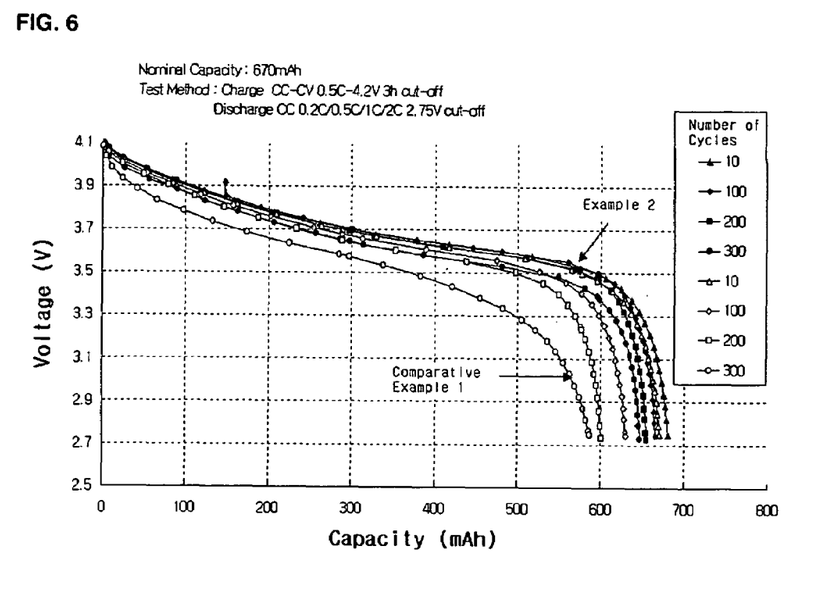
FIG. 6 is a graph illustrating discharge capacity and voltage of cells manufactured by using negative active materials according to Example 2 of the present invention and Comparative Example 1 at the 10th, 100th, 200th, and 300th cycles.

FIG. 6 shows discharge capacity and voltage of batteries of Example 2 and Comparative Example 1 at the 10th, 100th, 200th, and 300th cycles.

The results shown in FIG. 6 are summarized in the following Table 1.

TABLE 1

| | Comparative Example 1 | | | | Example 2 | | | |
|---|---|---|---|---|---|---|---|---|
| | Capacity (mAh) | | Voltage (V) | | Capacity (mAh) | | Voltage (V) | |
| | 100th cycle | 200th cycle | 100th cycle | 200th cycle | 100th cycle | 200th cycle | 100th cycle | 200th cycle |
| Data | 630 | 600 | 3.66 | 3.65 | 660 | 650 | 3.69 | 3.69 |

As shown in FIG. 6 and Table 1, the cell of Example 2 has a high discharge capacity and a high discharge voltage at the 10th, 100th, 200th, and 300th cycles.

Figure 7:
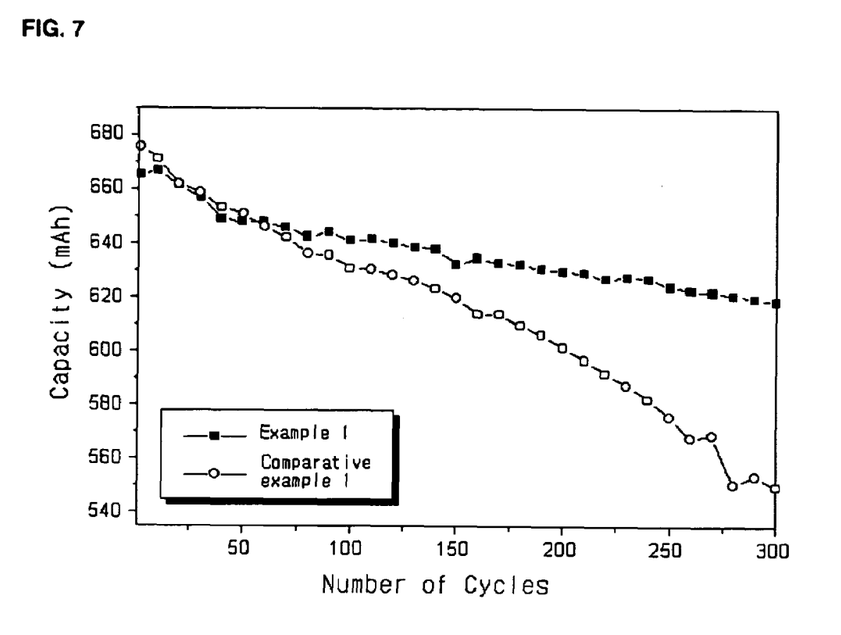
FIG. 7 is a graph illustrating cycle-life characteristics of cells manufactured by using negative active materials according to Example 2 of the present invention and Comparative Example 1.

FIG. 7 shows the cycle-life characteristics of Example 2 and Comparative Example 1. The cycle-life characteristics are measured by charging and discharging these cells at a 1 C. rate. As shown in FIG. 7, the cell of Example 2 has excellent cycle-life characteristics compared to that of Comparative Example 1, since the cell of Example 2 is coated with a surface-treatment layer to which water as well as Al-isopropoxide is added.

EXAMPLE 3

An ICP463448-type lithium cell was fabricated using the same procedure as in Example 2, except that Al-isopropoxide and pure water at a weight ratio of 1:1 (at a molecular ratio of 1:10) were used.

EXAMPLE 4

An ICP463448-type lithium cell was fabricated using the same procedure as in Example 2, except that Al-isopropoxide and pure water at a weight ratio of 1:2 (at a molecular ratio of 1:22) were used.

EXAMPLE 5

An ICP463448-type lithium cell was fabricated using the same procedure as in Example 2, except that Al-isopropoxide and pure water at a weight ratio of 1:3 (at a molecular ratio of 1:33) were used.

EXAMPLE 6

An ICP463448-type lithium cell was fabricated using the same procedure as in Example 2, except that Al-isopropoxide and pure water at a weight ratio of 1:6 (at a molecular ratio of 1:67) were used.

Table 2 shows the $H_2O$ amount in the negative active material, and the adherent strength between a collector and the negative active material slurry.

Table 2: $H_2O$ amount in the negative active material and Adherent Strength of the electrode plate according to using water and an organic solvent as a solvent for the surface-treatment process

| Sample | $H_2O$ amount in negative active material (ppm) | Adherent strength of electrode (gf/mm) |
|---|---|---|
| Example 2 | 260~335 | No more than 1 |
| Example 3 | 200~230 | No more than 1 |
| Example 4 | 150~160 | No more than 1 |
| Example 5 | 110~120 | 7.5 |
| Example 6 | 70~90 | 7.8 |

As shown in Table 2, the adherent strength is dramatically increased for the cell of Example 5, for which the surface-treatment layer is further added with water to a weight ratio of 1:3 of Al-isopropoxide and pure water. It is postulated that this is because of the following reaction between Al-isopropoxide and water:

$$Al(OCH(CH_3)_2)_3 + 3H_2O \rightarrow Al(OH)_3 + 3(OCH(CH_3)_2)_3^- + 3H^+ \quad \text{Reactive Formula 1}$$

It is known that Al-isopropoxide is sensitive to water so that the above-mentioned reaction progresses when Al-isopropoxide is contacted wit Accordingly, when water is not added to Al-isopropoxide, $H_2O$ present in the atmosphere will be incorporated into the surface of the negative active material so that the amount of water in the negative active material will spontaneously increase (more than 150 ppm). If the negative electrode is fabricated using the highly moisturized negative active material, the polyvinylidene fluoride binder aggregates and the adherent strength of the electrode decreases. Therefore, by adding water during preparation of the surface-treatment layer, Al-isopropoxide reacts with the water before the coating liquid is applied to the carbon source so that the reactant thereof is not sensitive to $H_2O$ and the carbon source coated with the surface-treatment layer becomes hydrophobic. The water amount in the negative active material is thereby not increased and the adherent strength is not weakened.

Table 3 shows the thickness change of a battery after expansion of the negative active material.

TABLE 3

| Sample | Percentage of thickness change |
|---|---|
| Reference Example 1 | 12.2% |
| Example 4 | 8.3% |
| Example 5 | 7.5% |
| Example 6 | 5.3% |

As shown in Table 3, the cells of Examples 4 to 6, to which water is added to the solvent of the surface-treatment layer, have less change in thickness after expansion of the negative active materials than that of Reference Example 1 to which water is not added.

The present invention provides a negative active material coated with a surface-treatment layer of a coating-element-included hydroxide, a coating-element-included oxyhydroxide, a coating-element-included oxycarbonate, or a coating-element-included hydroxycarbonate, and thereby a battery having the negative active material has less change in thickness after expansion of the active material, that is, from 12.2% to 5.3%. Further, cycle-life characteristics are improved (7% or more improvement at the 200th cycle) and voltage characteristics are improved (0.04 V or more improvement at the 200th cycle).

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A lithium rechargeable battery comprising a cathode, an electrolyte, and an anode, the anode comprising a negative active material comprising:
   a core having a carbon source capable of reversibly intercalating lithium ions; and
   a surface-treatment layer formed on a surface of the core, the surface-treatment layer consisting essentially of at least one metal compound selected from the group consisting of metal hydroxides, metal oxyhydroxides, metal oxycarbonates, and metal hydroxidecarbonates wherein the metal is selected from the group consisting of Mg, Al, K, Na, Ca, Si, Ti, Sn, V, Ge, Ga, B, As, Zr, and mixtures thereof.

2. The lithium rechargeable battery according to claim 1, wherein the carbon source comprises an amorphous carbon or a crystalline carbon.

3. The lithium rechargeable battery according to claim 1, wherein the metal compound is dissolved in a mixture of water and an organic solvent.

4. The lithium rechargeable battery according to claim 1, wherein the metal compound is amorphous, semi-crystalline, or crystalline.

5. The lithium rechargeable battery according to claim 4, wherein the carbon source is crystalline.

6. The lithium rechargeable battery according to claim 1, wherein the surface-treatment layer has a thickness ranging from about 1 to about 300 nm.

7. The lithium rechargeable battery according to claim 6, wherein the surface-treatment layer has a thickness ranging from about 1 to about 50 nm.

8. The lithium rechargeable battery according to claim 1, wherein the metal compound is present in an amount ranging from about $2 \times 10^{-5}$ to about 2% by weight based on the total weight of the negative active material.

9. The lithium rechargeable battery according to claim 8, wherein the metal compound is present in an amount ranging from about 0.001 to about 2% by weight based on the total weight of the negative active material.

10. A lithium rechargeable battery prepared by:

coating a carbon source capable of reversibly intercalating lithium ions with a coating liquid, the coating liquid consisting essentially of a solute of a metal compound and a solvent, the solvent comprising a mixture of an organic solvent and water, and wherein the metal compound is selected from the group consisting of metal hydroxides, metal oxyhydroxides, metal oxycarbonates, and metal hydroxidecarbonates wherein the metal is selected from the group consisting of Mg, Al, K, Na, Ca, Si, Ti, Sn, V, Ge, Ga, B, As, Zr, and mixtures thereof;

drying the carbon source to produce an anode;

providing a cathode;

providing an electrolyte; and assembling the anode, cathode and electrolyte within a battery cell.

* * * * *